(12) United States Patent
Anthenat

(10) Patent No.: US 11,650,163 B2
(45) Date of Patent: May 16, 2023

(54) IV BAG INSPECTION APPARATUS AND METHOD

(71) Applicant: Bruce Alan Anthenat, Tijeras, NM (US)

(72) Inventor: Bruce Alan Anthenat, Tijeras, NM (US)

(*) Notice: Subject to any disclaimer, the term of this patent is extended or adjusted under 35 U.S.C. 154(b) by 0 days.

(21) Appl. No.: 17/902,991

(22) Filed: Sep. 5, 2022

(65) Prior Publication Data

US 2023/0071685 A1  Mar. 9, 2023

Related U.S. Application Data

(60) Provisional application No. 63/242,020, filed on Sep. 8, 2021.

(51) Int. Cl.
  G01N 21/88 (2006.01)
  A61J 1/18 (2023.01)

(52) U.S. Cl.
  CPC .......... *G01N 21/8803* (2013.01); *A61J 1/18* (2013.01); *G01N 21/8851* (2013.01); *G01N 2021/8816* (2013.01)

(58) Field of Classification Search
  CPC .......... G01N 21/8803; G01N 21/8851; G01N 2021/8816; A61J 1/18
  USPC ...................................................... 209/703
  See application file for complete search history.

(56) References Cited

U.S. PATENT DOCUMENTS

| | | | | |
|---|---|---|---|---|
| 5,341,854 A | * | 8/1994 | Zezulka | B01F 33/00 141/2 |
| 2002/0039183 A1 | * | 4/2002 | Yagita | G01N 21/9027 356/240.1 |
| 2016/0200462 A1 | * | 7/2016 | Kriheli | G06Q 10/06316 700/214 |
| 2018/0021220 A1 | * | 1/2018 | Tribble | A61J 1/2048 700/235 |
| 2019/0066288 A1 | * | 2/2019 | Dudzik | G01N 21/8851 |
| 2022/0390313 A1 | * | 12/2022 | Pope | G01N 25/72 |

FOREIGN PATENT DOCUMENTS

WO   WO-2021108497 A1 * 6/2021 ................ G01J 3/50

\* cited by examiner

*Primary Examiner* — Terrell H Matthews
(74) *Attorney, Agent, or Firm* — Quickpatents, LLC; Kevin Prince

(57) ABSTRACT

An apparatus for inspection of IV bags includes a base having a working surface. A conveyor is raised above the working surface with conveyor supports and includes a plurality of bag clips, each adapted to hold one of the IV bags in an inverted position at one of a plurality of workstations. A controller moves the conveyor such that the bag clips each move from one workstation to the next at set intervals. A loading workstation places one of the IV bags into one of the bag clips. A bubble mitigation station agitates a fluid within the IV bag to dislodge any air bubbles. Two particle agitation stations agitate the fluid and any debris particles. An inspection station includes a backlighting apparatus, a camera, a display, and a rejection chute leading to a disposal receptacle. An unloading workstation unloads IV bags that have passed inspection.

13 Claims, 8 Drawing Sheets

IV BAG INSPECTION APPARATUS AND METHOD

CROSS-REFERENCE TO RELATED APPLICATIONS

This application claims the benefit of U.S. Provisional Patent Application 63/242,020, filed on Sep. 8, 2021, and is incorporated herein by reference.

STATEMENT REGARDING FEDERALLY SPONSORED RESEARCH AND DEVELOPMENT

Not Applicable.

FIELD OF THE INVENTION

This invention relates to medical device inspection, and more particularly to an apparatus and method for inspection of filled IV bags.

BACKGROUND

Prior art of IV Bag inspection is principally a manual process performed by humans manually manipulating and inspecting the IV bags one at a time. Throughout the world IV bags are inspected manually by qualified inspectors, all while manually manipulating the IV bag and trying to see through various visual obstacles of the IV bag. These obstacles typically can include printing on the IV bag, bubbles in the liquid, and sometimes IV bags are made of EVA or other materials that are almost opaque. These visual obstacles are not going to disappear anytime soon, so manual inspection, semi-automated inspection, and fully automated inspection processes all face the same challenges.

The typical manual process of inspecting the IV bags include the steps:
1. An inspector picks up and manually manipulates the IV bag to agitate the IV bag in an effort to set any particles in motion.
2. The inspector orients the IV bag in front of a white background lighted area for several seconds, visually inspecting the IV bag for difficult-to-see dark colored particles.
3. The inspector re-orients the IV bag in front of a black background lighted area for several seconds inspecting the IV bag for difficult-to-see light colored particles.
4. The inspector either places the IV bag in a reject location/bin or places the IV bag in the "PASS" accepted product location/bin.

NOTE: The regulatory requirements of USP 790 and USP 1790 state that all manual inspections need to be double inspected. To meet this expectation, the process should be done twice (but rarely is).

This prior art manual process involves significant repetitive non-ergonomic movement (the individual IV bags can also be up to several pounds each). Further, the inspector must have superior visual acuity as well as the ability to avoid distractions and to stay focused on the inspection task as hand. The entire process takes a typical inspector approximately 20 seconds per IV bag to complete, and any variability of inspector-to-inspector inconsistency results in reduced quality of inspection. Variability of individual inspection timing duration results also results in reduced quality of inspection. Further, inconsistency in IV bag agitation, placement, or positioning by each inspector can introduce variations in the quality of the inspection. Still further, the best lighting systems currently in use for so-called "manual inspection booths" control the uniformity of the LED lighting to not more than 5% variation.

Therefore, there is a need for a device that produces more consistent inspections due to consistent position and movement of the IV bags in front of the human inspectors, and does not require the human inspectors to hold or otherwise manipulate the IV bags directly. Such a needed invention would take less time than the prior art inspection methods, and result in more consistent inspections with more consistent inspection quality. Such a needed apparatus would provide for uniformity of backlighting of the IV bags for inspection of not more than 0.05%. The present invention accomplishes these objectives.

SUMMARY OF THE INVENTION

The present device is an apparatus for semi-automated inspection by two or more human inspectors of IV bags that each contain a fluid. Additional human operators may be included to load or unload the apparatus, for example. A base includes a substantially flat working surface with at least three side edges. The working surface is preferably supported by a plurality of table legs, for example.

A conveyor is raised above the working surface with one or more conveyor supports. The conveyor is preferably a belt having a plurality of bag clips fixed thereto. Each bag clip is adapted to hold one of the IV bags in an inverted position above the working surface at one of a plurality of workstations. Each workstation is disposed in front of the conveyor and at one side edges of the base. Preferably each of the bag clips are spaced apart a given predetermined distance which corresponds to a distance between the workstations.

A controller is adapted for moving the conveyor with a motor, such that the bag clips each move from one workstation to the next workstation at set intervals, or as guided by the human inspectors. The controller and the motor are supplied with power from a power source, such as line voltage or the like. The controller further includes at least one user interface, such as soft buttons on a tablet computer, buttons or dials on a control panel, or electro-mechanical buttons, on a remote control interface. The belt may include timing apertures that let LED light from an LED emitter through the timing apertures and into a detector so that the controller can determine when the bag clips have each advanced to the next workstation, stopping the conveyor from moving for a predetermined period of time, such as 8-10 seconds, for example. Then the conveyor advances the belt until each bag clip has advanced to the next workstation, and the process repeats.

A first workstation is a loading workstation adapted to receive one of the IV bags into one of the bag clips. Each bag clip is adapted to move between an open position wherein two opposing clamp members are separated to receive the IV bag therebetween, and a closed position wherein the two opposing clamp members are urged together to retain the IV bag therebetween. When released, a spring or other urging means urges the bag clip into the closed position.

A second workstation is a bubble mitigation station adapted for agitating the fluid within one of the IV bags to dislodge any air bubbles within the IV bag. Preferably the bubble mitigation station includes two or more solenoid-actuated striker adapted to strike the IV bag to dislodge the air bubbles within the IV bag, each adapted to strike the IV bag at different locations on the IV bag. The bubble mitigation station may further include a support surface disposed in front of the IV bag to prevent the IV bag from swinging forward and backward when struck by the solenoid-actuated striker.

A third workstation and a fifth workstation are particle agitation stations, each adapted for agitating the fluid within one of the IV bags to promote movement of the fluid and any debris particles within the IV bag. Preferably each particle agitation station, includes at least one ultrasonic actuator adapted to press against the IV bag and ultrasonically agitate the fluid and any debris particles within the IV bag.

A fourth workstation is a cosmetic inspection station having a backlighting apparatus disposed behind one of the IV bags and a rejection chute traversing the working surface and leading to a disposal receptacle.

A sixth workstation is an inspection stations having one of the backlighting apparatus disposed behind one of the IV bags, a camera disposed in front of the IV Bag, a display adjacent the IV bag and adapted to display an image of the IV bag from the camera, and one of the rejection chutes traversing the working surface and leading to a disposal receptacle.

Both the cosmetic inspection station and the inspection station each further includes one of the bag clip release actuators that engages the bag clip to release the IV bag when the human inspector has determined that the IV bag has failed the inspection. A remote control interface within each inspection station is adapted to actuate the bag clip release actuator.

A seventh workstation is an unloading workstation, wherein the IV bags are released from the bag clip to be stored in a container designated for IV bags that have passed inspection. A human operator may assist with this step if desired or necessary.

In use, one of the IV bags is loaded in the loading workstation onto one of the bag clips and moved by the conveyor to the bubble mitigation station. Any air bubbles in the IV bag move through buoyancy to a bottom of the inverted IV bag. Thereafter the IV bag is moved by the conveyor to the third workstation, the particle agitation station, where any debris particles within the IV bag are agitated into movement. Thereafter the IV bag is moved by the conveyor to the fourth workstation, the cosmetic inspection station, where one of the human inspectors inspects the IV bag directly to detect any debris particles or defects in the IV bag. The human inspector releases the IV bag from the bag clip and into the rejection chute if debris particles or defects are detected. Thereafter the IV bags that remain are moved by the conveyor to the fifth workstation, another of the particle agitations stations, and then moved into the sixth workstation, an inspection station. Another of the human inspectors inspects the image of the IV bag on the display to detect any debris particles or defects in the IV bag, releasing the IV bag from the bag clip and into the rejection chute if debris particles or defects are detected. Thereafter the IV bags that remain on the conveyor are moved by the conveyor to the seventh workstation, the unloading workstation, wherein the IV bags are released from the bag clip and moved into a container designated for IV bags that have passed inspection.

Preferably the working surface of the base has five side edges, wherein the first, second, and seventh workstations are along a first side of the working surface, the third and fourth workstations are along a third side of the working surface, and the fifth and sixth workstations are along a fourth side of the working surface.

The inspection system of the present invention is designed to handle 50 ml through 1,000 ml IV bags with minimal change of parts and no tools required to effect such a change in bag size. Potentially the system can handle up to 6 L IV bags. The inspection system is generally used in a typical drug packaging area.

All IV bag physical handling is completed by the automated inspection system (once the IV bag is placed into the loading bin). This eliminates any inspector variability in handling and positioning of the IV bags during the inspection process and allows the inspectors to focus on the inspection rather than the material handling aspects which leads to a more consistent inspection and improved inspection quality.

Mitigation of bubbles in the IV fluid is achieved (virtually totally eliminated from the body of the fluid), by removing the bubbles as visual obstacles. When the IV bag contains any foreign matter, the particle agitation station causes those particles to slowly move around in the fluid; which makes them much easier to observe by the inspector.

The inspection process is facilitated both by a specialized "backlit" LED lighting method, a high-resolution camera, and large screen LED monitor. The specialized LED lighting is controlled and monitored to a specific recipe derived intensity and controlled to less than 0.05% variation. The high-resolution camera and large screen LED monitor provides between 2.5× and 3× magnification of the bag and any particles in the bag. Those particles are quick and easy to detect since they are larger and in motion. While "backlighting" methodology is commonly used in inspection of other hard wall parenteral containers, the use of this advanced lighting technology is both different and new to IV bag inspection. In addition, the light box which houses the LED lights is of special design to ensure uniform beams of light are projected to the rear of the IV bag, which causes all foreign matter (particles) to appear as darker defects while producing little or no glare on the bag. This advanced lighting technology eliminates the need for both a dark and lighter background currently used by manual inspection operations. Each inspector need only inspect the IV bag against one color background (white) which minimizes eye strain for the inspector compared to continually switching back and forth from a bright white to a dark black background. Inspector eye strain is further reduced by the inspector making only indirect observation of the bag on the enlarged LED monitor where the back-lit (white background) is seen under subdued conditions. This feature reduces inspector eye fatigue and allows greater utilization of the inspector.

When a defect is found on the LED monitor, the inspector simply presses a reject button on the assigned remote controller to have the IV bag automatically removed from the inspection machine and placed in the reject bin for that station.

All IV bags that successfully pass inspection by the two inspectors are automatically ejected at the conclusion of the inspection cycle either into the "Good" bin or onto an optional conveyor belt to be carried to the next packaging process.

Inspection time values are set in the specific IV bag recipe, which can vary based on the container's size and shape, the fluid, and the qualified inspection time as determined by the qualification process.

The present system is designed to meet FDA expectations based on the requirements of USP 790 & USP 1790 regarding inspection of IV bags. Specifically, the present apparatus provides an equal or better inspection compared to the "standard" manual inspection, also ensuring that the physical observation period for the inspection has a duration of at least 5 seconds, and is fully compliant with all manual inspections which are required to be double inspected. The present invention is a device that produces more consistent inspections due to consistent position and movement of the IV bags in front of the human inspectors, and does not require the human inspectors to hold or otherwise manipulate the IV bags directly. The present invention requires less time than the prior art inspection methods, and result in more consistent inspections with more consistent inspection quality. The present apparatus provides for uniformity of backlighting of the IV bags for inspection of not more than 0.05%. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
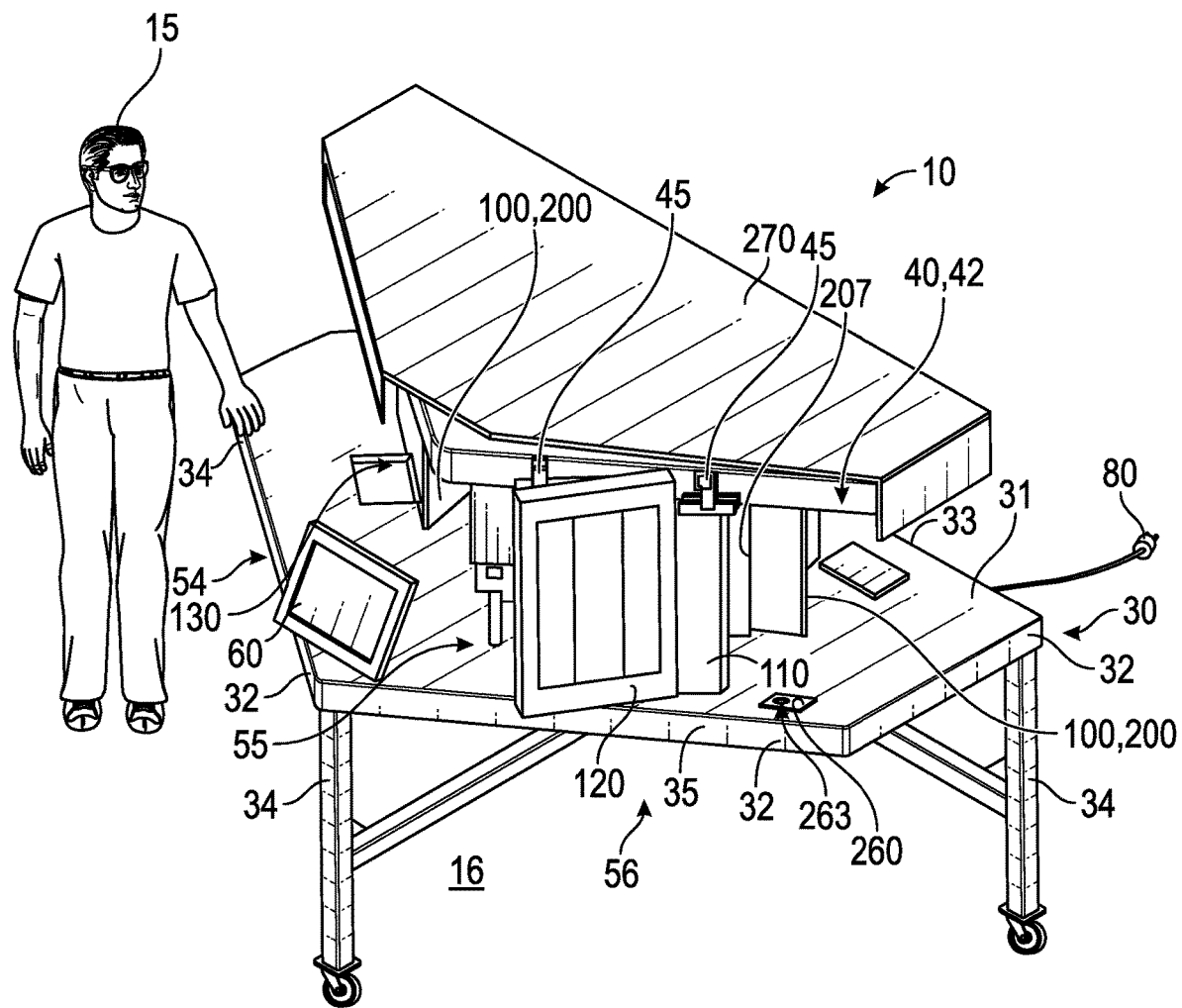
FIG. 1 is a perspective view of the invention.
Figure 2:
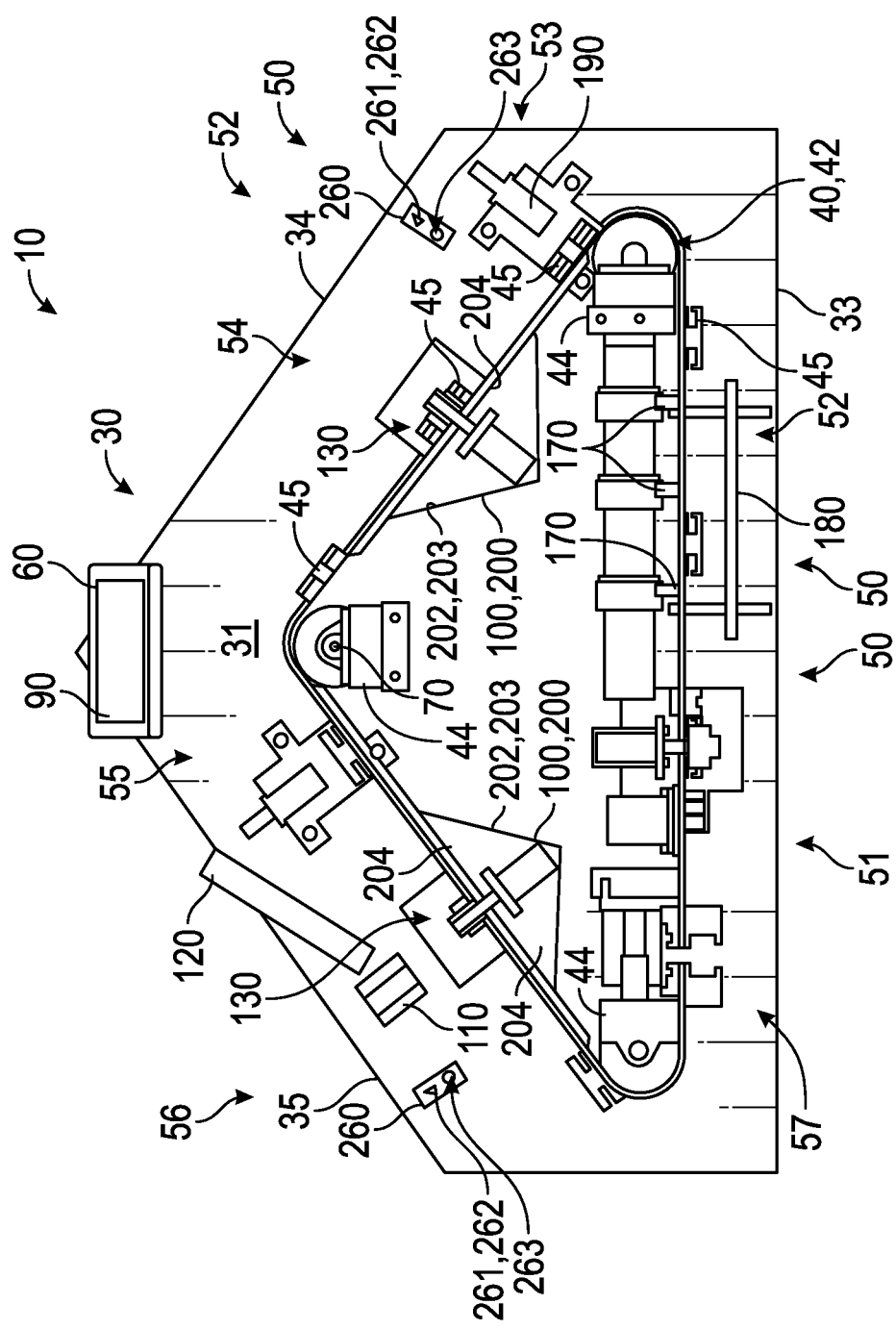
FIG. 2 is a top plan view of the invention.

FIGS. 1 and 2 illustrate an apparatus 10 for semi-automated inspection by two or more human inspectors 15 of IV bags 20 that each contain a fluid. Additional human operators (not shown) may be included to load or unload the apparatus 10.

A base 30 includes a substantially flat working surface 31 with at least three side edges 32. The working surface 31 is preferably supported by a plurality of table legs 34, for example.

A conveyor 40 is raised above the working surface 31 with one or more conveyor supports 44. The conveyor 40 is preferably a belt 42 having a plurality of bag clips 45 fixed thereto. Each bag clip 45 is adapted to hold one of the IV bags 20 in an inverted position 29 above the working surface 31 at one of a plurality of workstations 50. Each workstation 50 is disposed in front of the conveyor 40 and at one side edges 32 of the base 30. Preferably each of the bag clips 45 are spaced apart a given predetermined distance which corresponds to a distance between the workstations 50, such as 18 inches or the like.

A controller 60 is adapted for moving the conveyor with a motor 70, such that the bag clips 45 each move from one workstation 50 to the next workstation 50 at set intervals, or as guided by the human inspectors 15. The controller 60 and the motor 70 are supplied with power from a power source 80, such as line voltage or the like. The controller 60 further includes at least one user interface 90, such as soft buttons on a tablet computer ((not shown but as is known in the art), buttons or dials on a control panel (not shown but as is known in the art), or electro-mechanical buttons 261, 262 on a remote control interface 260. The belt 42 may include timing apertures (not shown) that let LED light from an LED emitter (not shown) through the timing apertures and into a detector (not shown), so that the controller 60 can determine when the bag clips 45 have each advanced to the next workstation 50, stopping the conveyor 40 from moving for a predetermined period of time, such as 8-10 seconds, for example. Then the conveyor 40 advances the belt 42 until each bag clip 45 has advanced to the next workstation 50, and the process repeats.

Figure 3:
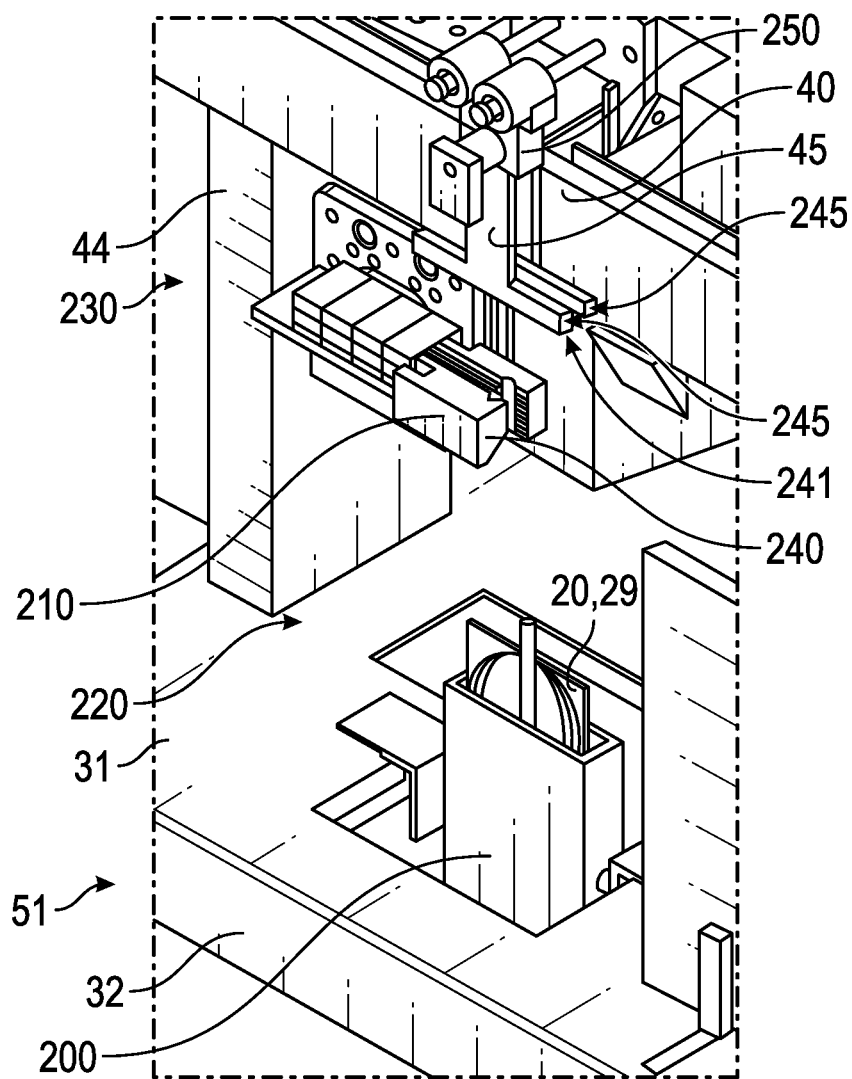
FIG. 3 is a partial perspective view of a loading workstation of the invention.

A first workstation 50 is a loading workstation 51 (FIGS. 2 and 3) adapted to receive one of the IV bags 20 into one of the bag clips 45. Preferably the loading workstation 51 includes an IV bag loading box 200 (FIG. 3) adapted for holding one of the IV bags 20 in the inverted position 29. A robotic gripping apparatus 210 is adapted to move to a lowered position 220 to secure the IV bag 20 in a clamp 240, and then to move up to a raised position 230 with the IV bag 20 to engage the IV bag 20 with one of the bag clips 45. Each bag clip 45 is adapted to move between an open position 241 wherein two opposing clamp members 245 are separated to receive the IV bag 20 therebetween, and a closed position 242 wherein the two opposing clamp members 245 are urged together to retain the IV bag 20 therebetween. A bag clip release actuator 250 is adapted to press one of the opposing clamp members 245 of the bag clip 45 to open the bag clip 45 into the open position 241. When released, a spring or other urging means (not shown) urges the bag clip 45 into the closed position 242. The bag clip release actuator 250 may be solenoid-driven and activated by the controller 60. A human operator may assist with this step if desired or necessary, loading the IV bags upside-down into the IV bag loading box 200 as it becomes free. Alternately another conveyor (not shown) may load the IV bag loading box 200 automatically.

Figure 4:
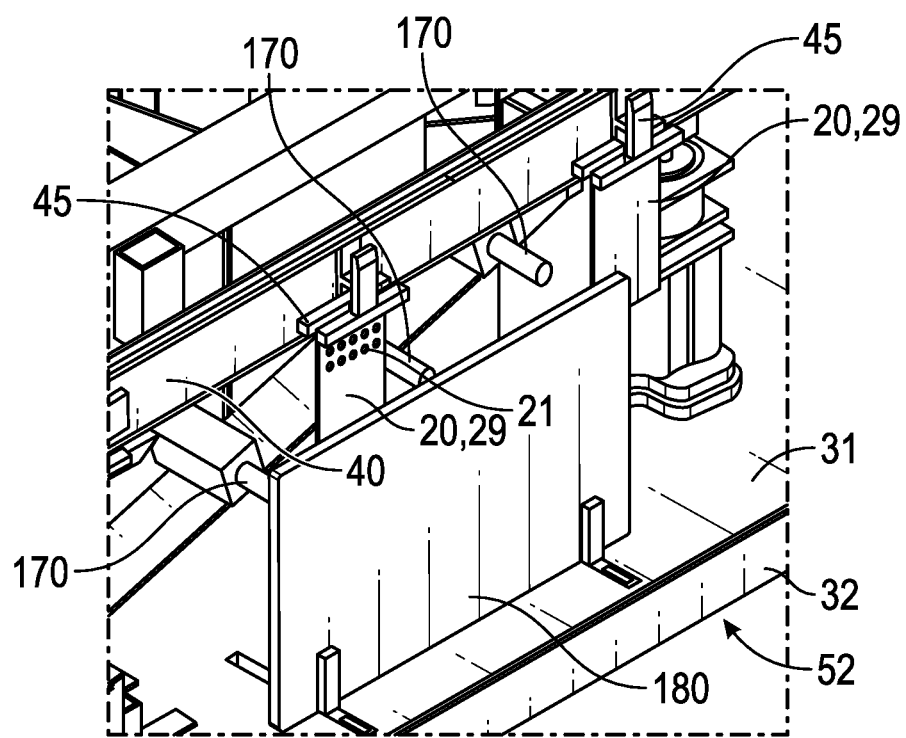
FIG. 4 is a partial perspective view of a bubble mitigation station of the invention.

A second workstation 50 is a bubble mitigation station 52 (FIGS. 2 and 4) adapted for agitating the fluid within one of the IV bags 20 to dislodge any air bubbles 21 within the IV bag 20. Preferably the bubble mitigation station 52 includes at least one solenoid-actuated striker 170 adapted to strike the IV bag 20 to dislodge the air bubbles 21 within the IV bag 20. Preferably the at least one solenoid-actuated striker 170 is two or more solenoid-actuated strikers 170, each adapted to strike the IV bag 20 at different locations on the IV bag 20. The bubble mitigation station may further include a support surface 180 disposed in front of the IV bag 20 to prevent the IV bag 20 from swinging forward and backward when struck by the solenoid-actuated striker 170. Each solenoid-actuated striker 170 is adapted to strike the IV bag 20 while the IV bag 20 is directly in front of the solenoid-actuated striker 170, whether the conveyor 40 is moving the IV bag 20 or not. An IV bag detector (not shown), or apertures (not shown) within the conveyor belt 41 at each bag clip 45 may be used with LEDs and light detectors to actuate the solenoid-actuated strikers 170, for example. Other means known in the art for detecting a proper time to actuate the solenoid-actuated strikers 170 may also be utilized. Such solenoid-actuated strikers 170 are preferably electrically connected with the controller 60, but may be independently powered and wired.

Figure 5:
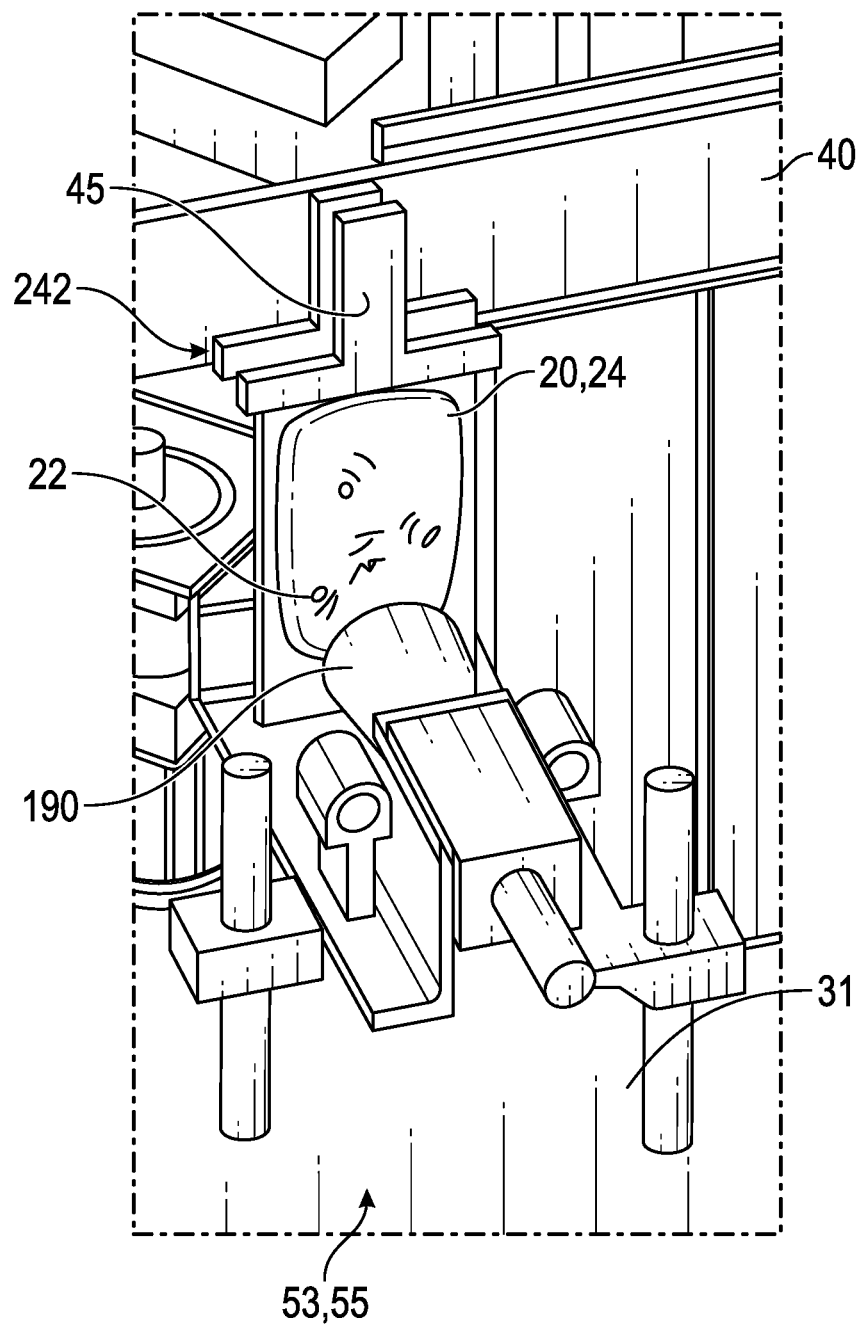
FIG. 5 is a partial perspective view of a particle agitation station of the invention.
Figure 6A:
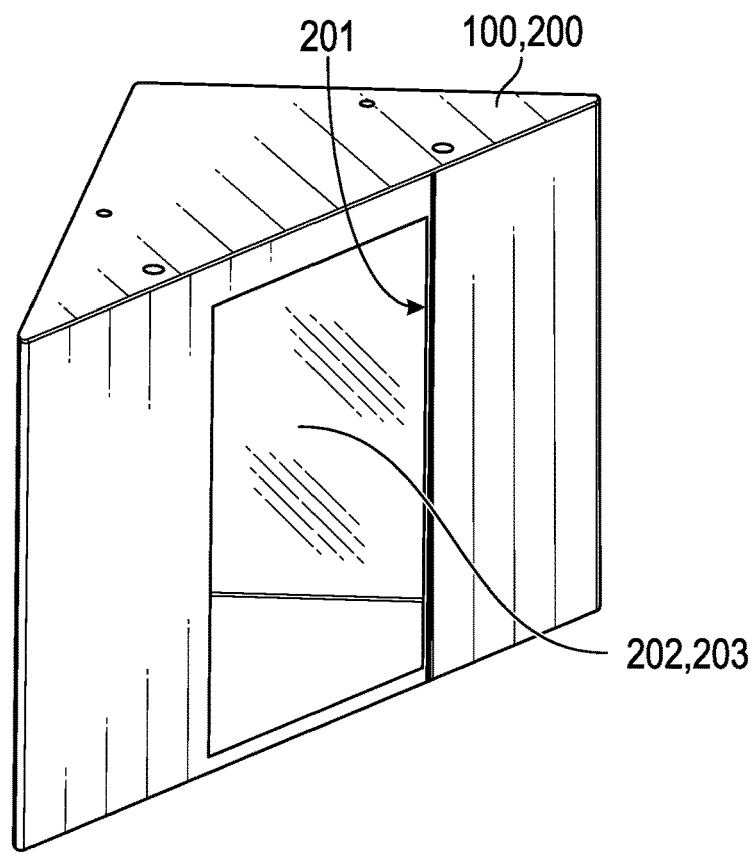
FIG. 6A is a partial perspective view of a backlighting apparatus of an inspection station of the invention.
Figure 6B:
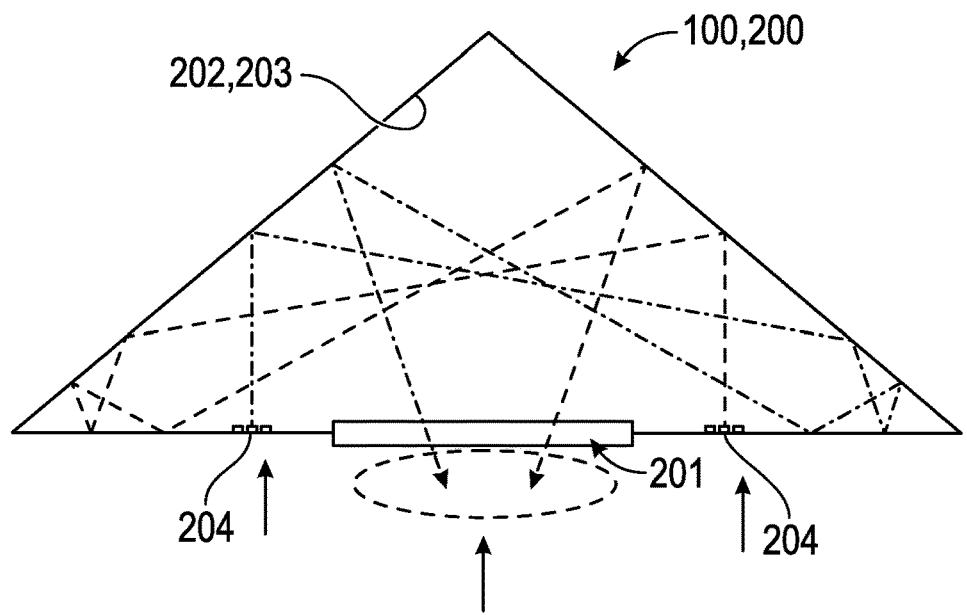
FIG. 6B is a top plan diagram of FIG. 6A, showing paths of light emanating from LEDs of the invention.
Figure 8:
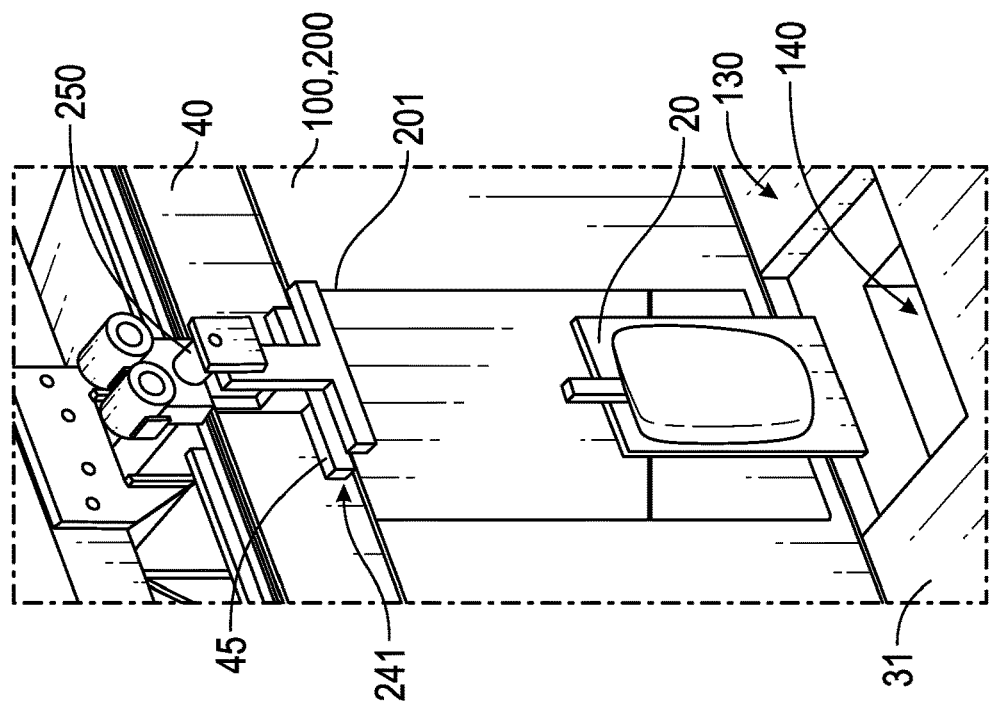
FIG. 8 is a partial perspective view of the inspection station, showing an IV bag rejected by a human inspector and falling into a rejection chute.
Figure 7:
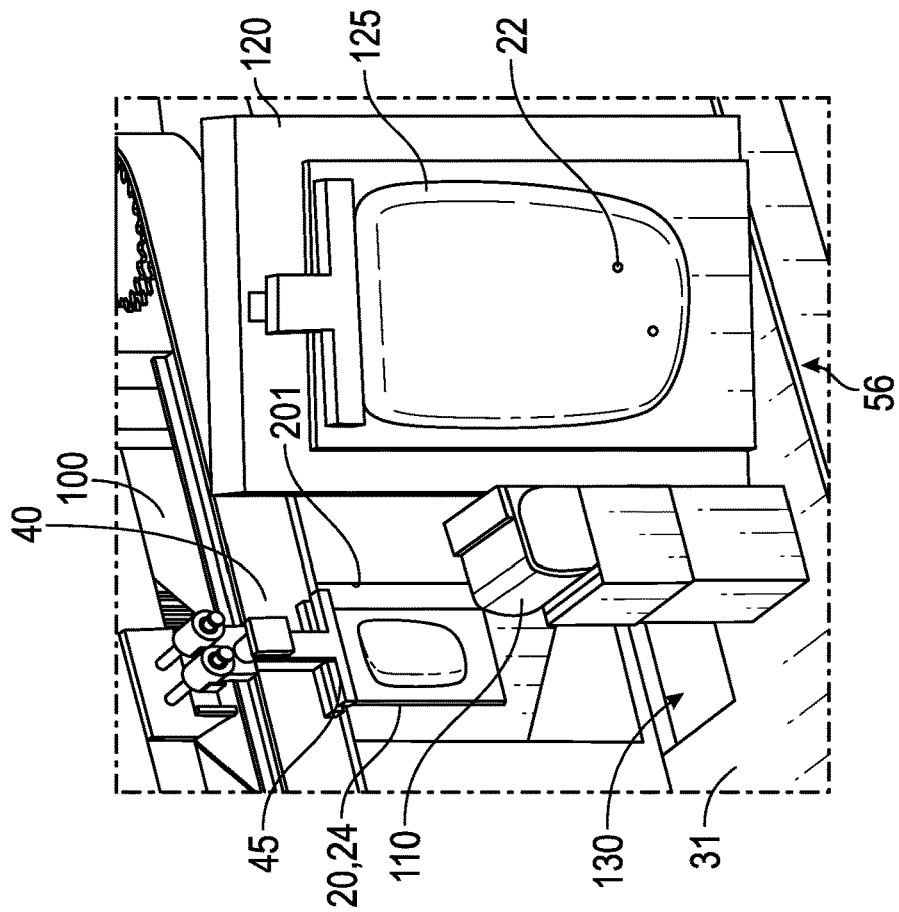
FIG. 7 is a partial perspective view of the inspection station of the invention.

A third workstation 50 and a fifth workstation 50 are particle agitation stations 53,55 (FIGS. 1, 2 and 5), each adapted for agitating the fluid within one of the IV bags to promote movement of the fluid and any debris particles 22. within the IV bag 20. Preferably each particle agitation station 53,55 includes at least one ultrasonic actuator 190 adapted to press against the IV bag 20 and ultrasonically agitate the fluid and any debris particles 22 within the IV bag 20. A solenoid (not shown) may be used to position the ultrasonic actuator 190 against the IV bag 20 when the IV bag 20 is detected at the agitation station 53,55. Any number of means for detecting the presence of the IV bag 20 at the agitation station 53,55 may be used as detailed previously. Alternately, for simplicity, when the conveyor 40 stops and it is assumed that one of the IV bags 20 is at the agitation station 53,55, the ultrasonic actuator 190 may be actuated, whether an IV bag 20 is positioned at the agitation station 53,55 or not.

A fourth workstation 50 is a cosmetic inspection station 54 (FIGS. 1, 2, 6A, 6B, and 8), having a backlighting apparatus 100 disposed behind one of the IV bags 20 and a rejection chute 130 traversing the working surface 31 and leading to a disposal receptacle 140. The backlighting apparatus 100 of the cosmetic inspection station 54 preferably includes a backlighting enclosure 200 having an opening 201, a reflective coating 202 on an inside surface 203 thereof, and at least two LEDs 204 positioned so that light from the LEDs 204 reflects at least once from the reflective coating 202 to exit the opening 201 in the backlighting enclosure 200, all such light emanating from the opening 201 being relatively uniform in brightness throughout the opening 201.

A sixth workstation 50 is an inspection station 56 (FIGS. 2, 6A, 6B, 7, and 8), having one of the backlighting apparatus 100 disposed behind one of the IV bags 20, a camera 110 disposed in front of the IV Bag 20, a display 120 adjacent the IV bag and adapted to display an image 125 of the IV bag 20 from the camera 110, and one of the rejection chutes 130 traversing the working surface 31 and leading to a disposal receptacle 140.

The backlighting apparatus 100 of the inspection station 56 preferably includes the backlighting enclosure 200 having the opening 201, the reflective coating 202 on the inside surface 203 thereof, and the at least two LEDs 204 positioned so that light from the LEDs 204 reflects at least once from the reflective coating 202 to exit the opening 201 in the backlighting enclosure 200, all such light emanating from the opening 201 being relatively uniform in brightness throughout the opening 201.

The cosmetic inspection station 54 and the inspection station 56 further include one of the bag clip release actuators 250 that engages the bag clip 45 to release the IV bag 20 when the human inspector 15 has determined that the IV bag 20 has failed the inspection. A remote control interface 260 within each cosmetic inspection station 54 and the inspection station 56 is adapted to actuate the bag clip release actuator 250. The remote control interface 260 may be wirelessly connected with the controller 60, or through interface wires (not shown), as is known in the art. The remote control interface 260 may further include a pause button 261 so that human inspectors 15 can pause the conveyor 40 if they need more time for the inspection of a particular IV bag 20, for example. A resume button 262 may be included on the remote control interface 260 to re-activate the conveyor 40, or the paus button 261 and the resume button 262 may be the same button that just toggles the state of the conveyor 40 between a paused state and an activate state, for example. A reject button 263 may be included on the remote control interface 260 to cause the bag clip release actuator 250 to open the bag clip 245 to release the IV bag 20 into the disposal chute 130. Such a remote control interface 260 is station-specific, meaning that the remote control interface 260 proximate the cosmetic inspection station 54 does not cause any action to be taken in the inspection station 56, or vice versa.

Figure 9:
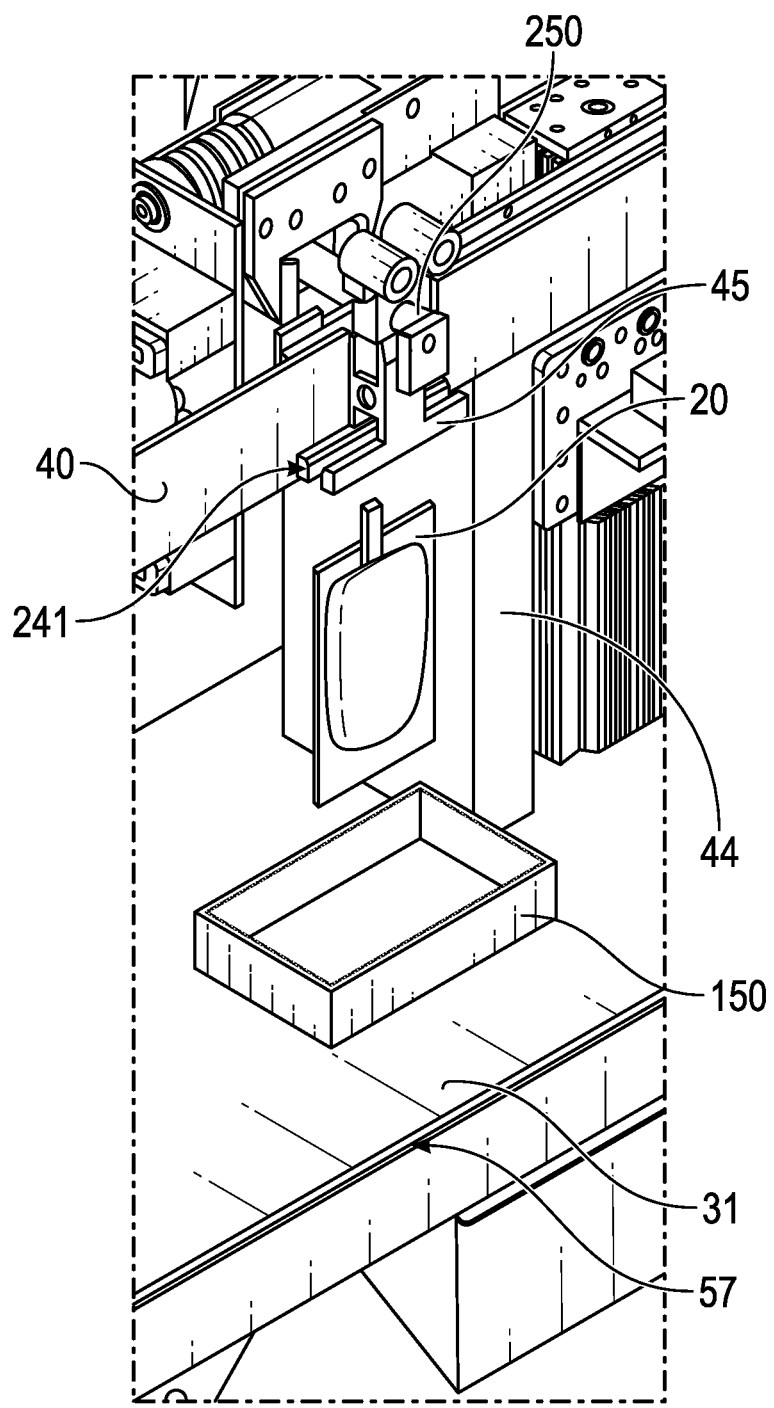
FIG. 9 is a partial perspective view of an unloading workstation of the invention.

A seventh workstation is an unloading workstation 57 (FIGS. 2 and 9), wherein the IV bags 20 are released from the bag clip 45 to be stored in a container 150 designated for IV bags 20 that have passed inspection. A human operator may assist with this step if desired or necessary. Alternately the IV bags 20 that have passed inspection may drop onto an alternate conveyor (not shown) for subsequent packaging and/or transportation elsewhere.

In use, one of the IV bags 20 is loaded in the loading workstation 51 onto one of the bag clips 45 and moved by the conveyor 40 to the bubble mitigation station 52. Any air bubbles 21 in the IV bag 20 move through buoyancy to a bottom 160 of the inverted IV bag 20. Thereafter the IV bag 20 is moved by the conveyor 40 to the third workstation 50, the particle agitation station 53. Any debris particles 22 within the IV bag 20 are agitated into movement, and thereafter the IV bag 20 is moved by the conveyor 40 to the fourth workstation 50, the cosmetic inspection stations 54, where one of the human inspectors 15 inspects the IV bag 20 to detect any debris particles 22 or cosmetic defects in the IV bag 20. The human inspector releases the IV bag 20 from the bag clip 45 and into the rejection chute 130 if debris particles 22 or defects are detected. Thereafter the IV bag 20 is moved by the conveyor 40 to the fifth workstation 50, another of the particle agitations stations 55, and then moved into the sixth workstation 50, the inspection station 56. Another of the human inspectors 15 inspects the image 125 of the IV bag 20 on the display 120 to detect any debris particles 22 or defects in the IV bag 20, releasing the IV bag 20 from the bag clip 45 and into the rejection chute 130 if debris particles 22 or defects are detected. Thereafter the IV bag 20 is moved by the conveyor 40 to the seventh workstation 50, the unloading workstation 57, wherein the IV bag 20 is released from the bag clip 45 and moved into a container designated for IV bags that have passed inspection.

Preferably the working surface 31 of the base 30 has five side edges 32, wherein the first, second, and seventh workstations 50 are along a first side 33 of the working surface 31, the third and fourth workstations 50 are along a third side 34 of the working surface 31, and the fifth and sixth workstations 50 are along a fourth side 35 of the working surface 31 (FIG. 2). A cover 270 (FIG. 1) may be included to shield the human inspectors 15 from being injured by the moving conveyor 40 and other moving parts.

While a particular form of the invention has been illustrated and described, it will be apparent that various modifications can be made without departing from the spirit and scope of the invention. For example, the cosmetic inspection station 54 and the first particle agitation station 53 may be omitted in a single-inspection apparatus. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An apparatus for semi-automated inspection by two or more human inspectors of IV bags, each containing a fluid, comprising:
    a base having a substantially flat working surface with at least three side edges;
    a conveyor raised above the working surface with one or more conveyor supports;
    a plurality of bag clips each fixed with the conveyor and adapted to hold one of the IV bags in an inverted position above the working surface at one of a plurality of workstations, each workstation disposed in front of the conveyor and at one of the side edges of the base;
    a controller adapted for moving the conveyor with a motor such that the bag clips each move from one workstation to the next at set intervals, the controller and motor supplied with power from a power source, the controller further including at least one user interface;
    a first workstation being a loading workstation adapted to receive one of the IV bags into one of the bag clips;
    a second workstation being a bubble mitigation station adapted for agitating the fluid within one of the IV bags to dislodge any air bubbles within the IV bag;
    a third workstation and a fifth workstation being particle agitation stations each adapted for agitating the fluid within one of the IV bags to promote movement of the fluid and any debris particles within the IV bag;
    a fourth workstation being a cosmetic inspection station having a backlighting apparatus disposed behind one of the IV bags, and a rejection chute traversing the working surface and leading to a disposal receptacle;
    a sixth workstation being an inspection station having one of the backlighting apparatuses disposed behind one of the IV bags, a camera disposed in front of the IV bag, a display adjacent the IV bag adapted to display an image of the IV bag from the camera, and one of the rejection chutes traversing the working surface and leading to a disposal receptacle;
    a seventh workstation being an unloading workstation, wherein the IV bag is released from the bag clip to be stored in a container designated for IV bags that have passed inspection;
    whereby an IV bag is loaded in the first workstation onto one of the bag clips and moved by the conveyor to the second workstation, wherein any bubbles are mitigated towards the bottom of the inverted IV bag, thereafter the IV bag being moved by the conveyor to the third workstation, wherein any debris particles within the IV bag are agitated into movement, thereafter the IV bag being moved by the conveyor to the fourth workstation where one of the human inspectors inspects the image of the IV bag on the display to detect any debris particles or cosmetic defects in the IV bag, the human inspector releasing the IV bag from the bag clip and into the rejection chute if debris particles or defects are detected, thereafter the IV bag being moved by the conveyor to the fifth workstation, wherein any debris particles within the IV bag are agitated into movement, thereafter the IV bag being moved by the conveyor to the sixth workstation where one of the human inspectors inspects the image of the IV bag on the display to detect any debris particles or defects in the IV bag, the human inspector releasing the IV bag from the bag clip and into the rejection chute if debris particles or defects are detected, thereafter the IV bag being moved by the conveyor to the seventh workstation where the IV bag is release from the bag clip and moved into the container designated for IV bags that have passed inspection.

2. The apparatus of claim 1 wherein the working surface has five side edges, wherein the first, second, and seventh workstations are along a first side of the working surface, the third and fourth workstations are along a third side of the working surface, and the fifth and sixth workstations are along a fourth side of the working surface.

3. The apparatus of claim 1 wherein the bubble mitigation station includes at least one solenoid-actuated striker adapted to strike the IV bag to dislodge the air bubbles within the IV bag, the bubble mitigation station further including a support surface disposed in front of the IV bag to prevent the IV bag from swinging forward and backward when struck by the solenoid-actuated striker.

4. The apparatus of claim 3 wherein the bubble mitigation station includes three of the solenoid-actuated striker, each adapted to strike the IV bag at a different location on the IV bag.

5. The apparatus of claim 4 wherein each solenoid-actuated striker is adapted to strike the IV bag while the IV bag is directly in front of the solenoid-actuated striker, whether the conveyor is moving the IV bag or not.

6. The apparatus of claim 1 wherein each particle agitation station includes at least one ultrasonic actuator adapted to press against the IV bag and ultrasonically agitate the fluid and any debris particles within the IV bag.

7. The apparatus of claim 1 wherein the backlighting apparatus of the cosmetic inspection station and the inspection station both include a backlighting enclosure having an opening, a plurality of mirrors on an inside surface, and at least two LEDs positioned so that light from the LEDs reflects at least once from one of the mirrors to exit the opening in the backlighting enclosure relatively uniformly.

8. The apparatus of claim 1 wherein the loading workstation includes an IV bag loading box adapted for holding one of the IV bags in the inverted position, and a robotic gripping apparatus adapted to move to a lowered position to secure the IV bag in a clamp, and then to move up to a raised position to engage the IV bag with one of the bag clips.

9. The apparatus of claim 1 wherein each bag clip is adapted to move between an open position wherein two opposing clamp members are separated, and a closed position wherein the two opposing clamp members are pressed together to hold the IV bag therebetween.

10. The apparatus of claim 1 wherein the cosmetic inspection station and the inspection station each further includes a bag clip release actuator that engages the bag clip to release the IV bag when the human inspector has determined that the IV bag has failed the inspection, a remote control interface adapted proximate the human inspector adapted to actuate the bag clip release actuator.

11. The apparatus of claim 1 wherein the unloading workstation further includes a bag clip release actuator that engages the bag clip to release the IV bag upon reaching the unloading workstation.

12. The apparatus of claim 10 wherein the remote control interface further includes a pause button and a restart button, the remote control interface adapted to communicate with the controller to pause the controller advancing the conveyor with the motor.

13. An apparatus for semi-automated inspection by two or more human inspectors of IV bags, each containing a fluid, comprising:
a base having a substantially flat working surface with five side edges;
a conveyor raised above the working surface with one or more conveyor supports;
a plurality of bag clips each fixed with the conveyor and adapted to hold one of the IV bags in an inverted position above the working surface at one of a plurality of workstations, each workstation disposed in front of the conveyor and at one of the side edges of the base;
a controller adapted for moving the conveyor with a motor such that the bag clips each move from one workstation to the next at set intervals, the controller and motor supplied with power from a power source, the controller further including at least one user interface;
a first workstation being a loading workstation adapted to receive one of the IV bags into one of the bag clips, the loading workstation including an IV bag loading box adapted for holding one of the IV bags in the inverted position, and a robotic gripping apparatus adapted to move to a lowered position to secure the IV bag in a clamp, and then to move up to a raised position to engage the IV bag with one of the bag clips, the clamp releasing the IV bag after the IV bag is secured with the bag clip, each bag clip being adapted to move between an open position wherein two opposing clamp members are mutually separated, and a closed position wherein the two opposing clamp members are pressed together to hold the IV bag therebetween;
a second workstation being a bubble mitigation station adapted for agitating the fluid within one of the IV bags to dislodge any air bubbles within the IV bag and includes three solenoid-actuated striker adapted to strike the IV bag to dislodge the air bubbles within the IV bag, each solenoid-actuated striker adapted to strike the IV bag at a different location on the IV bag, the bubble mitigation station further including a support surface disposed in front of the IV bag to prevent the IV bag from swinging forward and backward when struck by one of the solenoid-actuated strikers, each solenoid-actuated striker being adapted to strike the IV bag while the IV bag is directly in front of the solenoid-actuated striker, whether the conveyor is moving the IV bag or not;
a third workstation and a fifth workstation being particle agitation stations each adapted for agitating the fluid within one of the IV bags to promote movement of the fluid and any debris particles within the IV bag, each particle agitation station including at least one ultrasonic actuator adapted to press against the IV bag and ultrasonically agitate the fluid and any debris particles within the IV bag;
a fourth workstation being a cosmetic inspection station having a backlighting apparatus disposed behind one of the IV bags and a rejection chute traversing the working surface and leading to a disposal receptacle, the backlighting apparatus including a backlighting enclosure having an opening, a plurality of mirrors on an inside surface, and at least two LEDs positioned so that light from the LEDs reflects at least once from one of the mirrors to exit the opening in the backlighting enclosure relatively uniformly, the cosmetic inspection station further includes a bag clip release actuator that engages the bag clip to release the IV bag when the human inspector has determined that the IV bag has failed the inspection, a remote control interface adapted proximate the human inspector adapted to actuate the bag clip release actuator;

a sixth workstation being an inspection station having one of the backlighting apparatuses disposed behind one of the IV bags, a camera disposed in front of the IV bag, a display adjacent the IV bag adapted to display an image of the IV bag from the camera, and the rejection chute traversing the working surface and leading to a disposal receptacle, the backlighting apparatus of the inspection station including the backlighting enclosure having the opening, the plurality of mirrors on the inside surface, and at least two of the LEDs positioned so that light from the LEDs reflects at least once from one of the mirrors to exit the opening in the backlighting enclosure relatively uniformly, the cosmetic inspection station and inspection station both further including the bag clip release actuator that engages the bag clip to release the IV bag when the human inspector has determined that the IV bag has failed the inspection, the remote control interface adapted proximate the human inspector adapted to actuate the bag clip release actuator;

a seventh workstation being an unloading workstation, wherein the IV bag is released from the bag clip to be stored in a container designated for IV bags that have passed inspection, the unloading workstation further includes a bag clip release actuator that engages the bag clip to release the IV bag upon reaching the unloading workstation;

wherein the first, second, and seventh workstations are along a first side of the working surface, the third and fourth workstations are along a third side of the working surface, and the fifth and sixth workstations are along a fourth side of the working surface;

wherein the cosmetic inspection station and the inspection station further include a bag clip release actuator that engages the bag clip to release the IV bag when the human inspector has determined that the IV bag has failed the inspection, a remote control interface adapted proximate the human inspector adapted to actuate the bag clip release actuator; and wherein the remote control interface further includes a pause button and a restart button, the remote control interface adapted to communicate with the controller to pause the controller advancing the conveyor with the motor;

whereby an IV bag is loaded in the first workstation onto one of the bag clips and moved by the conveyor to the second workstation, wherein any bubbles are mitigated towards the bottom of the inverted IV bag, thereafter the IV bag being moved by the conveyor to the third workstation, wherein any debris particles within the IV bag are agitated into movement, thereafter the IV bag being moved by the conveyor to the fourth workstation where one of the human inspectors inspects the image of the IV bag on the display to detect any debris particles or defects in the IV bag, the human inspector releasing the IV bag from the bag clip and into the rejection chute if debris particles or defects are detected, thereafter the IV bag being moved by the conveyor to the fifth workstation, wherein any debris particles within the IV bag are agitated into movement, thereafter the IV bag being moved by the conveyor to the sixth workstation where one of the human inspectors inspects the image of the IV bag on the display to detect any debris particles or defects in the IV bag, the human inspector releasing the IV bag from the bag clip and into the rejection chute if debris particles or defects are detected, thereafter the IV bag being moved by the conveyor to the seventh workstation where the IV bag is release from the bag clip and moved into the container designated for IV bags that have passed inspection.

* * * * *